Patented Apr. 12, 1932

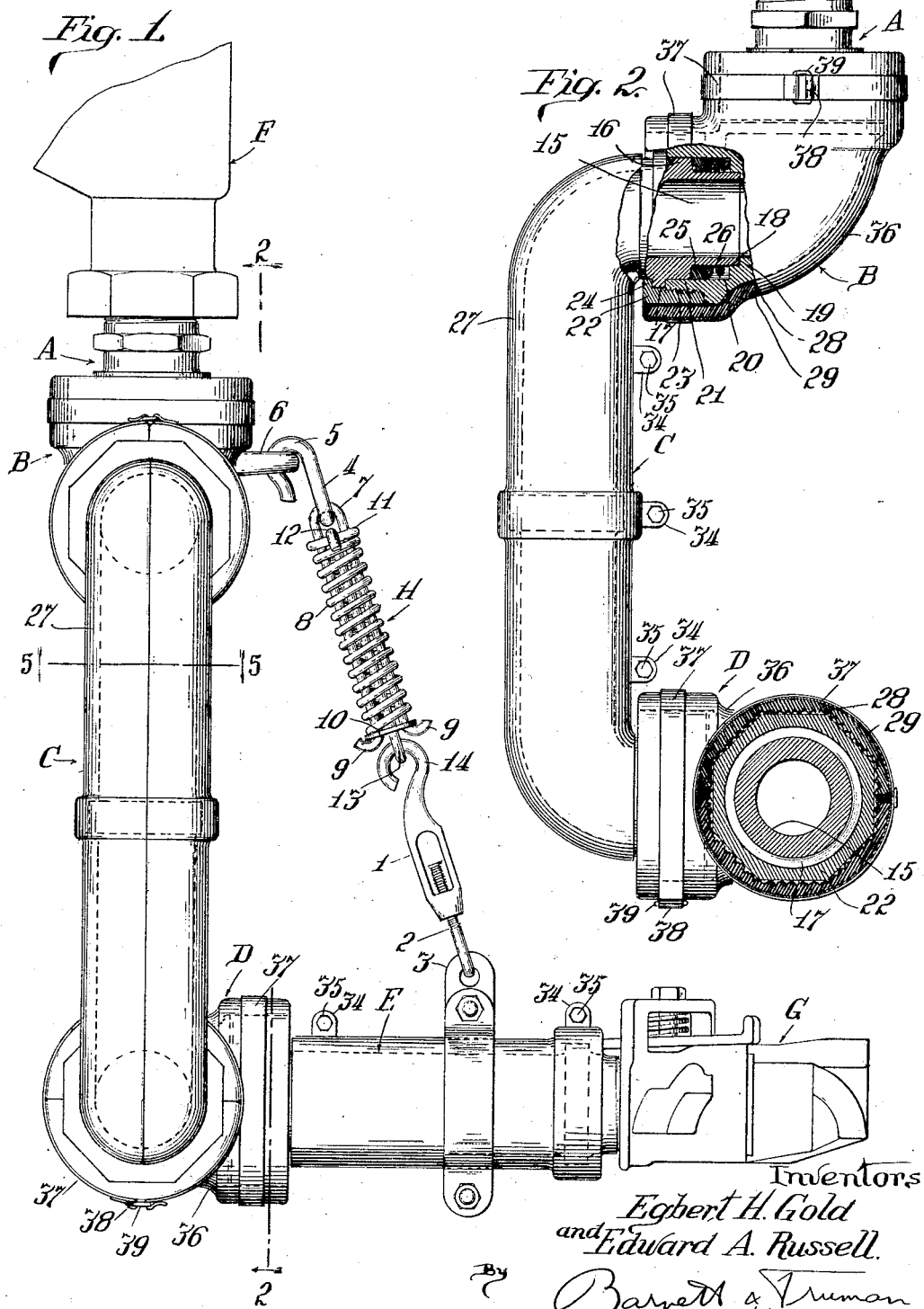

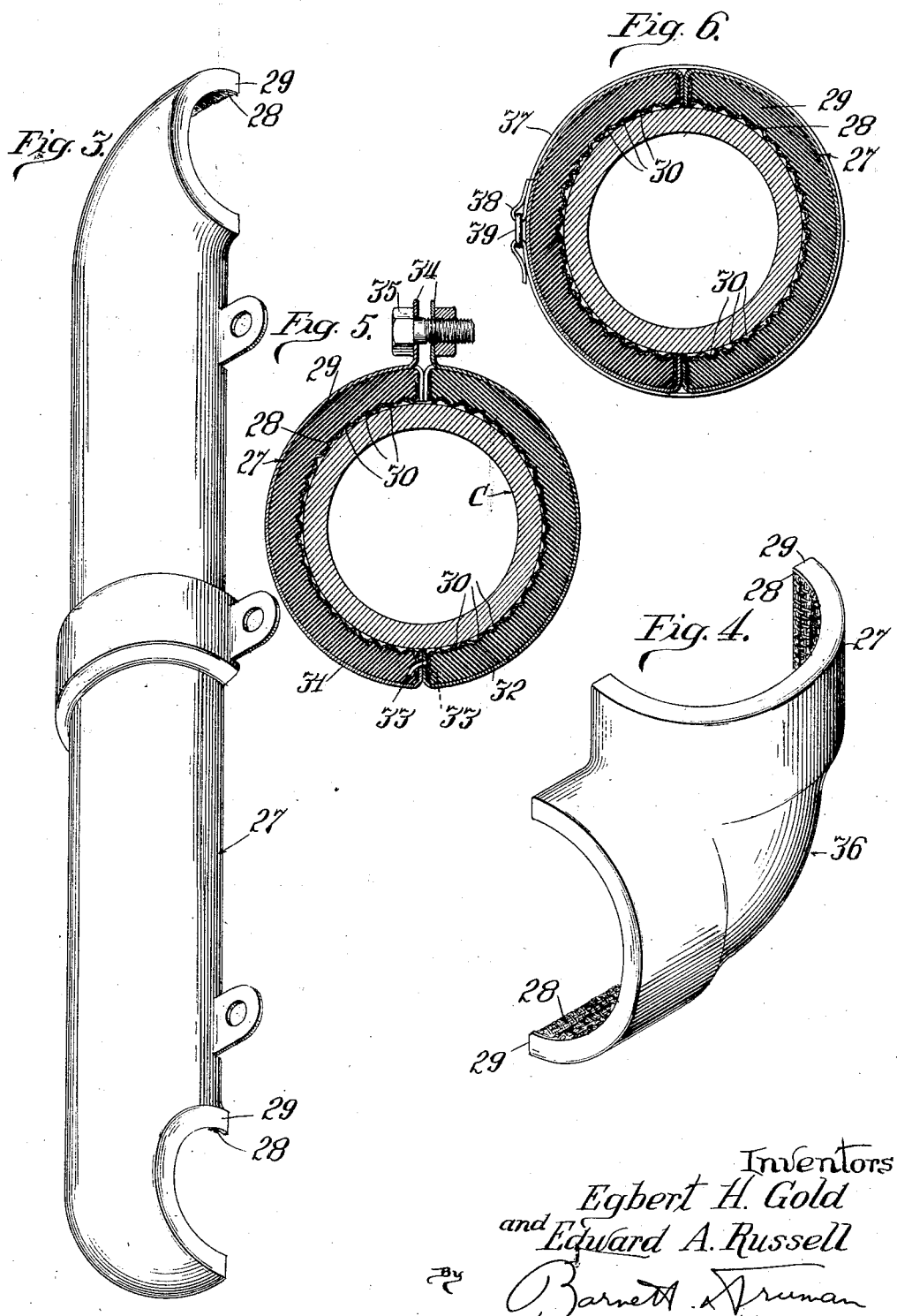

1,853,207

UNITED STATES PATENT OFFICE

EGBERT H. GOLD, OF EVANSTON, AND EDWARD A. RUSSELL, OF CHICAGO, ILLINOIS; SAID RUSSELL ASSIGNOR TO VAPOR CAR HEATING COMPANY, INC., OF CHICAGO, ILLINOIS, A CORPORATION OF NEW YORK; MARGARET JAYNE GOLD AND BISCAYNE TRUST COMPANY EXECUTORS OF SAID EGBERT H. GOLD, DECEASED

INSULATION FOR FLEXIBLE PIPE STRUCTURES

Application filed September 30, 1927. Serial No. 222,975.

This invention relates to new and improved means for insulating flexible pipe structures, and more particularly for insulating the articulated metal conduits used to complete the connections between the steam train pipes of the adjacent cars of a railway train.

In railway car steam heating systems, a steam supply pipe runs the full length of the train for carrying the steam from the source at the locomotive to the various radiating devices located on the several cars. This steam supply pipe consists of a train pipe extending the length of each individual car, and suitable flexible connections at the ends of the cars, these connections being coupled together so as to form a continuous steam conduit while permitting the necessary relative movements between the cars when rounding curves, etc. In the older installations, suitably reinforced sections of rubber hose were used for these flexible couplings, while more recently metallic conduits consisting of suitably articulated tubular metallic sections have been used for this purpose. One example of such a metallic conduit in partially disclosed in the present application, and is more completely disclosed and claimed in our copending application, Serial No. 217,050, filed September 2, 1927 now Patent No. 1,781,456, granted November 11, 1930.

A large portion of the steam pipes is exposed to the atmosphere, or only partially protected, and in order to minimize the heat loss it is desirable that the steam conduits be insulated as much as possible. This is entirely practicable with the stationary or rigid portions of the supply pipe, but with the forms of flexible conduit structures heretofore in use, which were either flexible throughout as in the rubber hoses or involved one or more joints of the ball and socket type, it has been impracticable to cover any great portion of the structure with insulating material due to the necessity for allowing flexibility of movement between the different portions of the structure. In the form of flexible conduit structure herein disclosed, the relative movement between any two abutting conduit members is confined to a single plane, and it is possible to almost completely cover the otherwise exposed portions of the conduit member with insulating material, since the several insulating coverings may abut in substantially the plane wherein the relative movements between adjacent conduit sections takes place.

The principal object of the present invention is to provide an insulating covering for a flexible conduit structure, having the advantages hereinabove briefly referred to and more definitely specified in the description which follows.

Another object is to provide an insulating covering for a pipe section, said covering consisting of permanently formed sections adapted to be fitted about the pipe, and provided with means for holding them securely in assembled position.

Another object is to provide an insulating covering for pipes consisting of an outer protective metallic casing, a filling of insulating material, and a lining adapted to provide an insulating air cushion between the covering and the steam pipe.

Other objects and advantages of this invention will be more apparent from the following detailed description of certain approved exemplifications of the invention.

In the accompanying drawings:

Fig. 1 is an elevation of one of the assembled conduit structures.

Fig. 2 is a vertical section partially broken away, and taken substantially on the line 2—2 of Fig. 1.

Figs. 3 and 4 are perspective views of two detached sections of the insulating covering.

Fig. 5 is an enlarged cross section, taken substantially on the line 5—5 of Fig. 1.

Fig. 6 is a view similar to Fig. 5, illustrating a different form of clamping means for holding the insulating covering sections in assembled position.

The flexible conduit structure to which this invention is applied consists of a plurality of rigid conduit members A, B, C, D and E, which are swiveled together as hereinafter explained, or in any other suitable manner. The uppermost conduit member A is adapted to support the entire assembly by being attached to the end of the car train pipe or the end train pipe valve indicated at F in Fig. 1. The coupler member G, which may be of any approved form, is mounted at the free end of the conduit member E at the other end of the flexible structure and is adapted to be mated with a similar coupler on the adjacent car.

A means shown generally at H is provided to support the lower members D, E and G of the structure when disconnected from an adjacent car coupling. In the form here shown, this connection H comprises a turnbuckle 1 having a hook 2 at its lower end engaging with an eye 3 mounted on the conduit member E. An upper link 4 has a hook 5 engaging in a bracket arm 6 extending from one side of the upper conduit member A and projecting over the lower horizontal conduit member E. The lower end of the link 4 is hooked within the closed end of a U-shaped member 7 which projects through a compression spring 8. The lower hooked ends 9 of member 7 engage about an annular washer 10 which abuts one end of the compression spring 8. A similar washer 11 at the other end of spring 8 is engaged by the hooked ends 12 of a U-shaped member 13 similar to member 7. The lower closed end of the member 13 is hooked within the eye 14 at the upper end of turn-buckle 1. This assembled supporting connection is not only sufficiently flexible to permit the necessary movements of the lower horizontally extending conduit members, but the compression spring 8 will also give sufficiently to permit the necessary extension of the conduit structure when the train is rounding curves.

The upper downwardly projecting conduit member A is provided with an externally threaded upper end portion whereby it is engaged within the downwardly projecting end of the car train pipe or end train pipe valve F. The conduit member B is in the form of an elbow having one portion projecting upwardly for engagement with conduit member A, and a horizontally projecting portion adapted to engage with the horizontally projecting elbow end of vertical conduit member C. The elbow member D is in all respects similar to elbow B and is adapted to form a connection between the horizontally turned lower end portion of conduit C and the end of the lower horizontal conduit member E. There are various ways in which the adjacent ends of these conduit sections may be swiveled together, one example being illustrated in the upper portion of Fig. 2 which is broken away for this purpose. As there shown, the horizontally projecting end portion 15 of conduit member C has the same internal diameter as the remainder of the conduit section, and in fact of all of the other conduit sections throughout the flexible structure. This end portion 15 is provided on its outer surface with an enlarged annular projection 16 from which extends an annular shoulder or ring 17. The extreme end portion 18 is of reduced external diameter so that the outer surface of this portion 18 and one end of the enlarged portion 16 form two walls of a chamber for receiving the sealing means hereinafter described. The adjacent open end of conduit member B is enlarged as at 19 to form an annular shoulder against which the end of the portion 18 of conduit C abuts. A little farther along the passage within member B is again enlarged as indicated at 20 to substantially the same internal diameter as the external diameter of the annular projection 16 on the member C. The extreme end portion 21 of the elbow member B surrounds a portion of the annular projection 16, abuts against one side of the ring 17, and is of substantially the same outer diameter as this ring. A collar 22 is internally threaded at 23 to engage similar threads upon the outer portion of the end 21 of elbow member B, and this collar is provided with an inturned end flange 24 adapted to engage behind the ring 17 on the conduit member C. This collar 22 serves to hold the conduit members against separation, while permitting the end of conduit C to swivel within the end of conduit B into which it telescope as hereinabove described.

An annular space or chamber will be formed between the overlapping extensions 18 and 21 of the conduit members C and B, and within this chamber is housed the annular gasket 25. A compression spring 26 is confined between this gasket and one end of the chamber and serves to force the gasket into engagement with the adjacent surfaces of the conduit members and thus effectively seal the joint between the members against the escape of steam. At the same time relative rotation will be permitted between the members about the central axis of the conduit passage therethrough, one of the members sliding upon the gasket 25 to permit this movement. It will be understood that similar swiveled connections and sealing means are provided between the interfitting end portions of each of the adjacent conduit members A to E inclusive.

In our copending application hereinabove referred to, other means for swiveling together the adjacent ends of the conduit sections are disclosed, and it is to be understood that as far as the present invention is concerned these or other forms of swiveled connections could be substituted for the one hereinabove briefly described by way of example.

It will be noted that although there are several curves in the steam passage through this conduit, the passage has a continuous and practically unbroken outer surface and is of substantially constant diameter from end to end of the structure. Experience has shown that additional turns in the steam passage have little influence toward increasing the resistance to the flow of steam, but any pockets or projections along the path of the steam serve to produce eddy currents and greatly impede the progress of the steam through the structure. The several swiveled joints arranged in planes at right angles to one another permit universal movements of the coupler G in any direction without deforming the steam passage or changing its cross sectional area at any point. It will be seen that although the aggregate movements permitted by the several swiveled joints permit universal bodily movement of the coupler G, there are no ball and socket joints or other individual universal joints employed in this structure, and the relative movement between any two adjacent sections of the structure takes place in a single plane, that is the plane in which the end of one section telescopes within the adjacent end of the other section. This makes it feasible to cover practically the entire conduit structure with insulating material, since the insulating covering for any one section may be made to terminate practically in the plane in which the relative rotation between the sections takes place.

The preferred form of insulating covering which is used according to the principles of this invention will now be described. The covering for each conduit section is made up of a plurality of parts (usually two) adapted to be fitted about the conduit or pipe section. In Fig. 3 is indicated in perspective one of the insulating sections for covering the conduit member C, and in Fig. 4 is indicated one of the sections adapted to be used about either of the elbow conduit members B or D. It will be understood that the insulating coverings for the members A and E will in a similar manner be shaped to conform to the contour of these respective sections. Each section of the insulating covering comprises an outer protective casing or jacket 27 of sheet steel, galvanized iron, or other suitable metal, and an inner lining 28 of wire mesh. Preferably this wire mesh will be corrugated as illustrated in the drawings. Suitable insulating material 29, such as asbestos composition, is molded or pressed into the chamber between the metallic casing 27 and the wire mesh lining 28. The wire mesh provides an irregular inner surface so that a multiplicity of air pockets will remain between the insulating covering and the enclosed pipe section, this confined body of air adding greatly to the insulating properties of the covering. The channels 30 formed by corrugating the wire mesh lining form additional air space and increase the volume of the confined air layer between the insulating covering and the metallic conduit.

Various means may be used to hold the several sections of the insulating covering in assembled position about the conduit member. In the preferred form illustrated, the covering member (for example the casing for conduit member C) is split into two substantially equal sections along a diametral plane and these sections, for example the sections 31 and 32 as shown in Fig. 5, are hinged together in some suitable manner along two of their adjacent edges. As shown in Fig. 5, integral lips or wire prongs 33 extend from the edge of one metallic casing into mating apertures in the adjacent covering section. Along the other adjacent edges of the sections 31 and 32, integral ears 34 extend outwardly from the casings 27 and are adapted to be joined together by a bolt and nut 35 or some equivalent fastening means.

It will be apparent that the insulating covering sections 36 (Fig. 4) which fit about the elbow members B and D, can only conveniently be hinged together adjacent one corner thereof. As a substitute for the hinged connections just described, or in locations where it is inconvenient to utilize such hinged connections, metallic straps 37 such as illustrated in Fig. 6 can be clamped about the mated sections of the insulating covering. In the example shown, the looped or hooked ends 38 of the strap 37 are connected by a wire ring or other similar means 39.

As shown in the lower portion of Fig. 2, where the insulating covers fit about portions of the conduit structures of irregular external contour, such as the nut 40 on collar 22, the insulating casings will be formed with a similar internal conformation to engage snugly about the conduit structure.

It will be apparent that the sections of the insulating covering may be given a substantially rigid and permanent form, and need not be deformed in order to assemble them about the conduit structure. The covering sections may be extended so that their end portions lie practically in the plane in which relative rotation between the conduit members takes place, so that practically no portion of the conduit members remains exposed and the heat loss is reduced to a minimum.

While this insulating covering has been described as applied to a steam pipe or conduit, it should be understood that it is equally applicable to conduits for any other fluid, the temperature of which differs from the surrounding atmosphere so that the transmission of heat to or from the conduit is to be avoided.

We claim:

An insulating covering for a section of steam pipe having elbow bends at the ends thereof, the covering comprising a pair of similar casings shaped to fit the pipe and abut one another in the diametrical plane containing the central axis of the pipe including the elbows whereby substantially the entire exterior surface of the pipe will be covered, each section consisting of an outer metallic shell having radial inwardly extending flanges at its sides and ends, a corrugated wire-mesh lining spaced from the outer shell by the flanges so as to form a complete inclosure, and a filling of insulating material inclosed by the shell and lining, and means for securing the sections together about the pipe.

EGBERT H. GOLD.
    EDWARD A. RUSSELL.